United States Patent
Odaka et al.

(10) Patent No.: US 8,860,406 B2
(45) Date of Patent: Oct. 14, 2014

(54) MAGNETIC ENCODER HAVING THIN DETECTION SURFACE

(71) Applicant: Fanuc Corporation, Yamanashi (JP)

(72) Inventors: Shunichi Odaka, Yamanashi (JP); Isao Kariya, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/676,659

(22) Filed: Nov. 14, 2012

(65) Prior Publication Data

US 2013/0141087 A1 Jun. 6, 2013

(30) Foreign Application Priority Data

Dec. 2, 2011 (JP) ................................. 2011-264728

(51) Int. Cl.
*G01B 7/30* (2006.01)
*G01D 5/244* (2006.01)

(52) U.S. Cl.
CPC .............. *G01B 7/30* (2013.01); *G01D 5/24442* (2013.01)
USPC ................. 324/207.25; 324/167; 324/207.21; 73/514.31

(58) Field of Classification Search
USPC ................................ 324/207.11–207.26, 167
See application file for complete search history.

(56) References Cited

U.S. PATENT DOCUMENTS

| | | | |
|---|---|---|---|
| 4,771,240 A | | 9/1988 | Meyer et al. |
| 4,935,698 A | * | 6/1990 | Kawaji et al. ............. 324/207.2 |
| 5,315,244 A | * | 5/1994 | Griebeler ................. 324/207.21 |
| 6,124,709 A | * | 9/2000 | Allwine ...................... 324/207.2 |
| 6,534,979 B1 | * | 3/2003 | Wineland ....................... 324/262 |
| 7,423,420 B2 | * | 9/2008 | Meyersweissflog .......... 324/174 |
| 2009/0079423 A1 | * | 3/2009 | Steinich et al. .......... 324/207.25 |
| 2011/0309824 A1 | * | 12/2011 | Takahashi et al. ........ 324/207.13 |

FOREIGN PATENT DOCUMENTS

| | | | |
|---|---|---|---|
| DE | 3447312 C2 | 12/1988 | |
| DE | 4340177 A1 | 6/1995 | |
| JP | 5969978 A | 4/1984 | |
| JP | 07280823 A | 10/1995 | |
| JP | 2000-292202 A | * 10/2000 | ............. G01D 5/245 |
| JP | 2000-292202 A | 10/2000 | |
| JP | 2000-292507 A | 10/2000 | |
| JP | 2000-298039 A | 10/2000 | |
| JP | 2000-298161 A | 10/2000 | |
| JP | 2006-241873 | 8/2006 | |
| JP | 2010060488 A | 3/2010 | |

OTHER PUBLICATIONS

Japanese Office Action dated Apr. 2, 2013 with Partial Translation (5 pages).
Office Action dated Nov. 7, 2013, corresponds to German patent application No. 102012022924.0.

* cited by examiner

*Primary Examiner* — Huy Q Phan
*Assistant Examiner* — Dustin Dickinson
(74) *Attorney, Agent, or Firm* — Lowe Hauptman & Ham LLP

(57) ABSTRACT

A magnetic encoder including an object to be detected, a casing opposite to the object, a magnet and a magnetic sensor accommodated in the casing is provided. The casing of the magnetic encoder has an opposite wall opposite to the object. The opposite wall has a thickened portion and a thin portion integrally formed with the thickened portion. The thin portion has a smaller thickness than the thickened portion. The magnetic sensor is situated at the thin portion.

10 Claims, 15 Drawing Sheets

MAGNETIC ENCODER HAVING THIN DETECTION SURFACE

BACKGROUND OF THE INVENTION

1. Field of the Invention

This invention relates to an encoder for detecting a rotational position, etc., of a rotor of an NC machine tool and the like, in particular a magnetic encoder for detecting changes in a magnetic flux in response to rotational movement of a rotor to obtain a rotational position, etc., of the rotor.

2. Description of the Related Art

A magnetic encoder is used in a machine tool, for example, for measuring a rotational velocity or a rotational position, etc., of a rotor, based on a magnetic flux which changes in response to rotational movement of the rotor (see JP 2000-292507 A).

There is a need for a magnetic encoder having a thin detection surface in order to improve sensitivity of a magnetic sensor.

SUMMARY OF THE INVENTION

According to a first aspect of the present invention, a magnetic encoder is provided, the magnetic encoder comprising: an object to be detected made of a magnetic material and capable of rotating about a rotational axis; a casing made of a non-magnetic material and spaced apart from the object in a direction perpendicular to the rotational axis; a magnet accommodated in the casing for generating a magnetic field; and a magnetic sensor for detecting changes in a magnetic field corresponding to rotational movement of the object, the magnetic sensor being accommodated in the casing and situated between the magnet and the object, wherein an opposite wall of the casing opposite to the object has a thickened portion and a thin portion integrally formed with the thickened portion, the thin portion having a smaller thickness than the thickened portion, the magnetic sensor being situated at the thin portion.

According to a second aspect of the present invention, in the first aspect, the thin portion of the opposite wall of the casing is formed by machine-cutting.

According to a third aspect of the present invention, in the first or second aspect, the opposite wall of the casing has a transition portion between the thickened portion and the thin portion, the transition portion having a thickness which continuously changes between the thickened portion and the thin portion.

According to a fourth aspect of the present invention, in the third aspect, the transition portion has a thickness which linearly changes between the thickened portion and the thin portion.

According to a fifth aspect of the present invention, in the third aspect, the transition portion has a thickness which changes in a curved manner between the thickened portion and the thin portion.

According to a sixth aspect of the present invention, in any one of the first to the fifth aspects, the thin portion defines a recess on an inner surface of the opposite wall, resin being provided in the recess.

According to a seventh aspect of the present invention, in the sixth aspect, the thin portion has a protrusion protruding inwardly in the casing from a circumferential edge of the thin portion.

According to a eighth aspect of the present invention, in any one of the first to the seventh aspects, the thin portion is situated in a plurality of positions on the opposite wall, a portion extending between the thin portions adjacent to each other has a larger thickness than that of the thin portion.

According to a ninth aspect of the present invention, in any one of the first to the eighth aspects, the magnetic sensor and an inner surface of the thin portion opposite to the magnetic sensor define a gap therebetween.

According to a tenth aspect of the present invention, in any one of the first to ninth aspect, the thin portion has a thickness in the range between 50 μm and 100 μm.

These and other objects, features and advantages of the present invention will become more apparent in light of the detailed description of exemplary embodiments thereof as illustrated by the drawings.

DETAILED DESCRIPTION

Embodiments of the present invention will be described with reference to the accompanied drawings. In order to clarify the drawings, the size of one element relative to another may be modified from a practical application.

Figure 1:
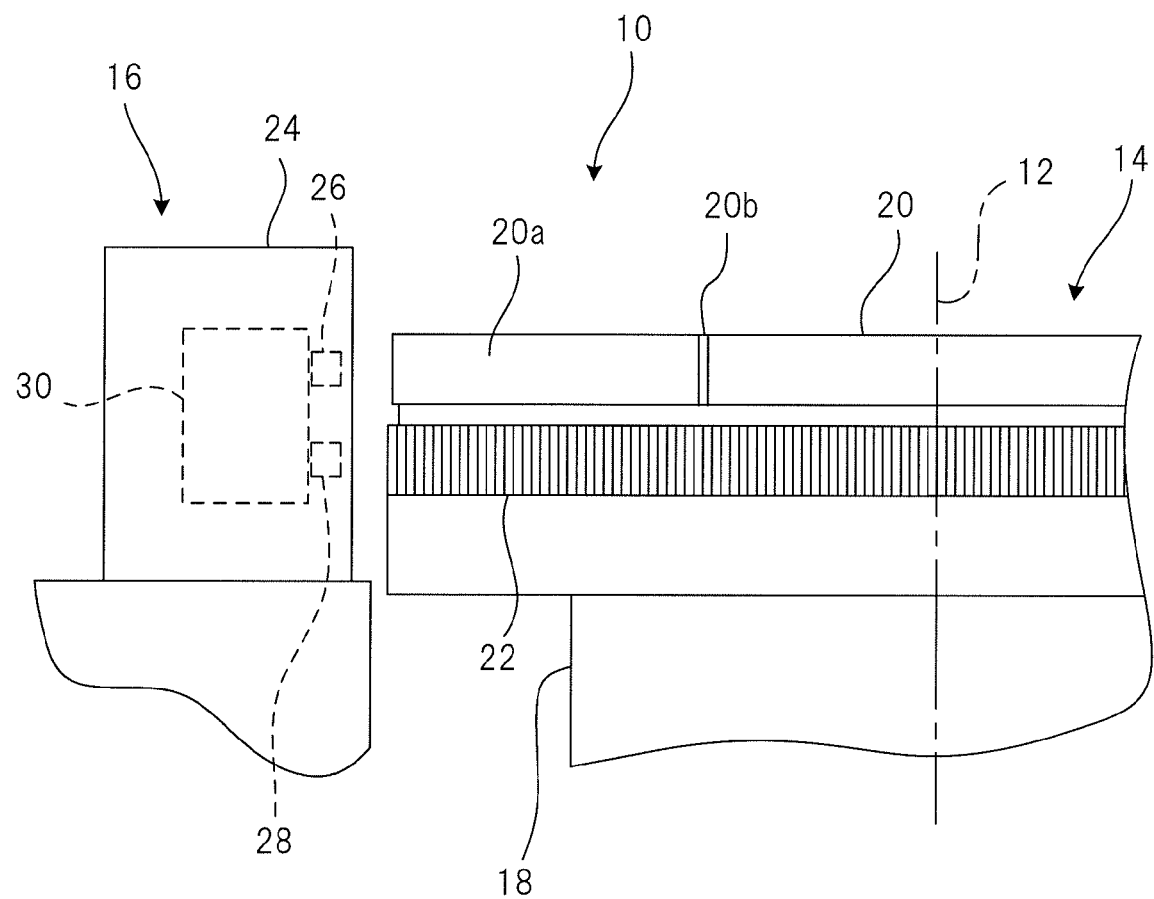
FIG. 1 is a schematic view illustrating an exemplary application of a magnetic encoder according to the present invention.

FIG. 1 is a schematic view illustrating an exemplary application of a magnetic encoder 10 according to the present invention.

The magnetic encoder 10 includes a toothed wheel 14 which is an object to be detected made of a magnetic material and capable of rotating around a rotational axis 12, and a sensor assembly 16 situated opposite to the toothed wheel 14. The toothed wheel 14 is attached to a rotor 18 such as a motor so as to rotate together therewith. The toothed wheel 14 includes an upper toothed portion 20 and a lower toothed portion 22 spaced apart from each other in a direction along the rotational axis 12. The sensor assembly 16 has a casing 24 made of a non-magnetic material such as aluminum and substantially having a hollow rectangular parallelepiped shape. The casing 24 is situated at a certain distance from the toothed wheel 14 in a direction perpendicular to the rotational axis 12.

The casing 24 accommodates a pair of magnetic sensors 26 and 28. The magnetic sensors 26 and 28 are positioned on line extending from the upper toothed portion 20 and the lower toothed portion 22 in a direction perpendicular to the rotational axis 12, respectively. The casing 24 also accommodates a magnet 30 for providing the magnetic sensors 26 and 28 with a biasing magnetic field.

The upper toothed portion 20 corresponding to the magnetic sensor 26 has a body 20a in the form of a circular plate and one tooth 20b protruding from the body 20a radially outwardly. When the tooth 20b faces the magnetic sensor 26, i.e., when the magnet 30, the magnetic sensor 26 and the tooth 20b are positioned substantially on line, the magnetic sensor 26 detects a greater magnetic flux density. In this way, the magnetic sensor 26 is able to detect rotational movement of the rotor 18 upon every revolution of the rotor 18.

The lower toothed portion 22 corresponding to the magnetic sensor 28 has teeth in the form of protrusions and depressions in the form of recesses alternately arranged in its entire circumference. Similarly to the above-described magnetic sensor 26, when the magnetic sensor 28 and each tooth of the lower toothed portion 22 are in position to face one another, a greater magnetic flux density can be detected by the magnetic sensor 28. In other words, when the magnetic sensor 28 and each depression of the lower toothed portion 22 are in position to face each other, a relatively smaller magnetic flux density is detected by the magnetic sensor 28. In this way, the magnetic sensors 26 and 28 positioned between the magnet 30 and the toothed wheel 14 are able to detect changes in a magnetic field which correspond to the rotational movement of the toothed wheel 14.

Figure 2A:
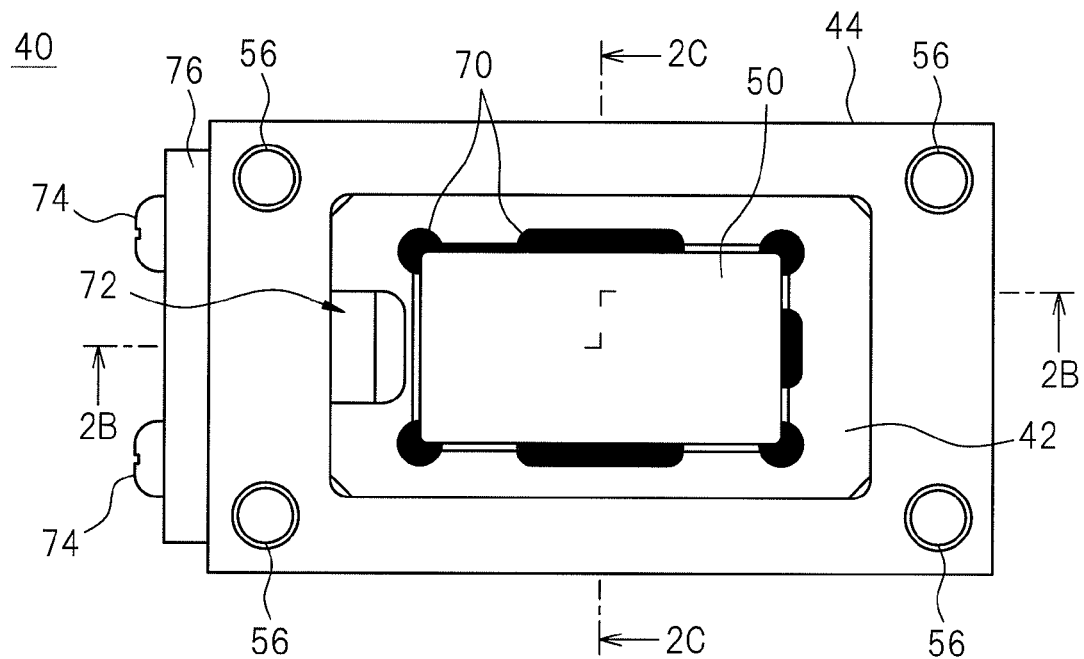
FIG. 2A is a side view illustrating a sensor assembly of a magnetic encoder according to a first embodiment of the present invention.
Figure 2B:
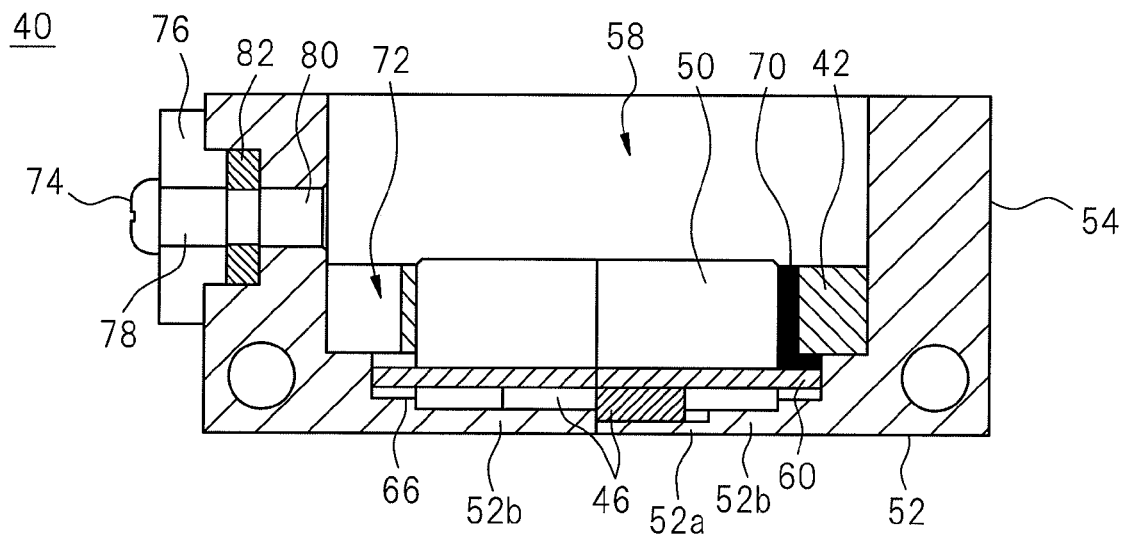
FIG. 2B is a sectional view illustrating the sensor assembly taken along line 2B-2B in FIG. 2A.
Figure 2C:
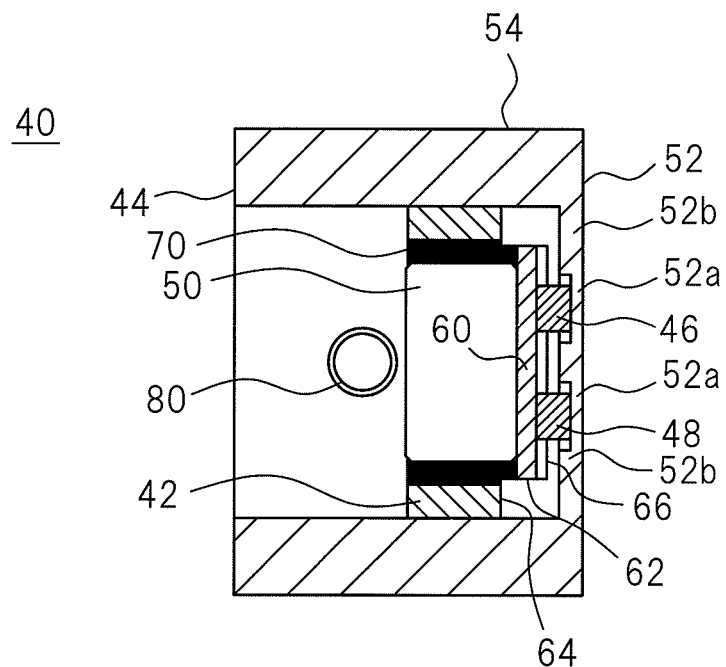
FIG. 2C is a sectional view illustrating the sensor assembly taken along line 2C-2C in FIG. 2A.
Figure 3:
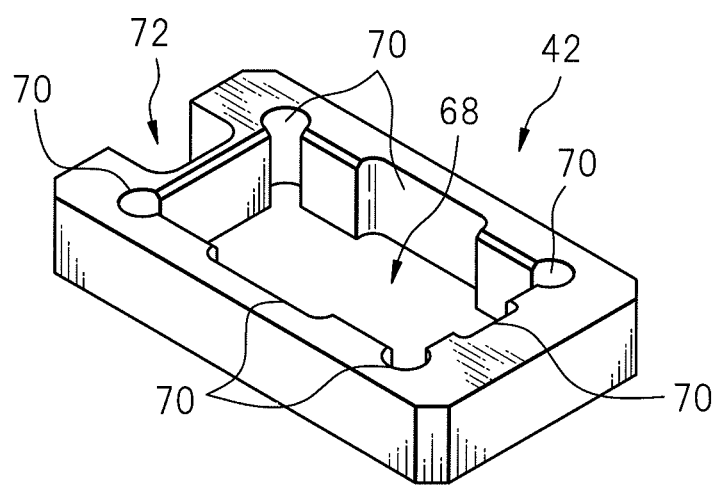
FIG. 3 is a perspective view illustrating a magnet holder of the magnetic encoder according to the first embodiment.
Figure 4A:
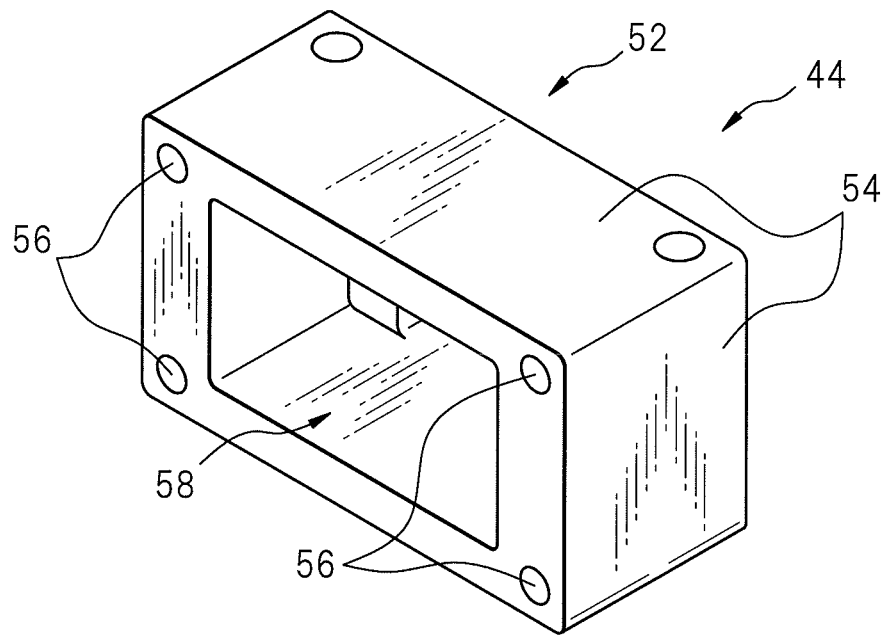
FIG. 4A is a perspective view illustrating a casing of the magnetic encoder according to the first embodiment.
Figure 4B:
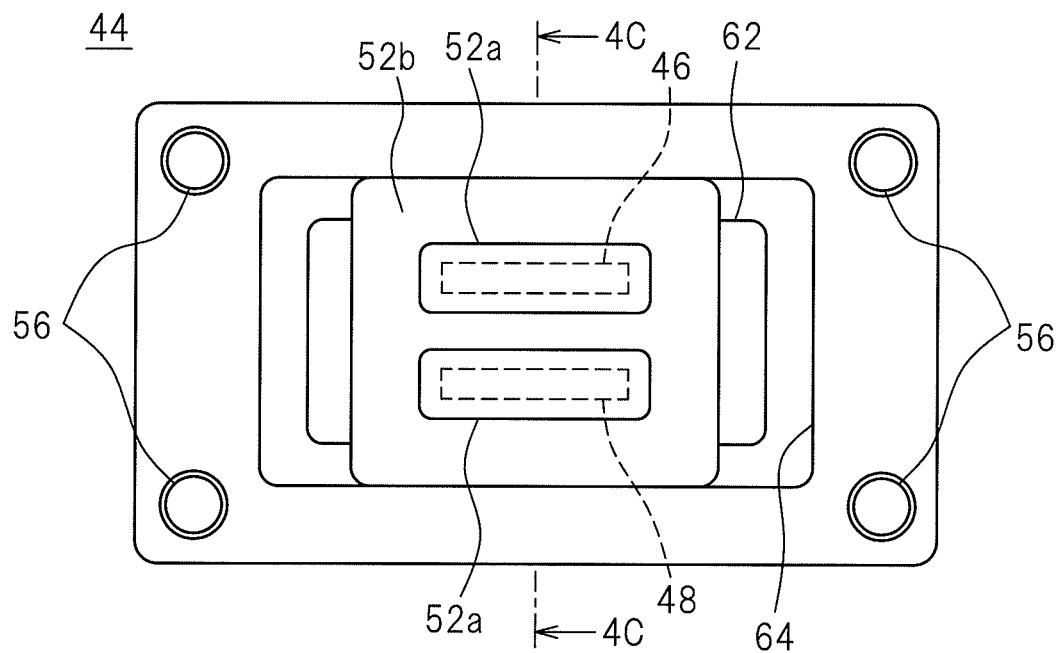
FIG. 4B is a side view illustrating the casing in FIG. 4A.
Figure 4C:
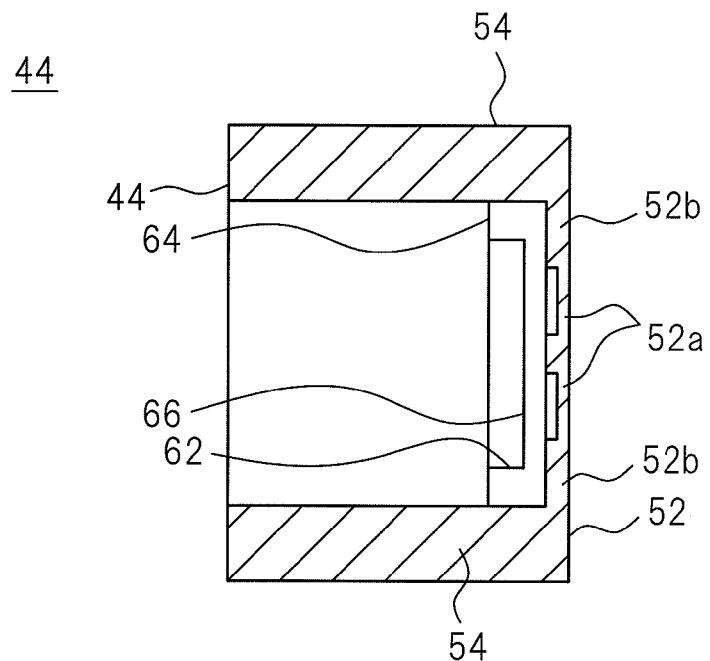
FIG. 4C is a sectional view illustrating the casing taken along line 4C-4C in FIG. 4B.

Referring to FIGS. 2 to 4, a magnetic encoder according to a first embodiment will be described. FIG. 2A is a side view illustrating a sensor assembly 40 of the magnetic encoder according to the first embodiment. FIG. 2B is a sectional view illustrating the sensor assembly 40 taken along line 2B-2B in FIG. 2A. FIG. 2C is a sectional view illustrating the sensor assembly 40 taken along line 2C-2C in FIG. 2A. FIG. 3 is a perspective view illustrating a magnet holder 42 of the magnetic encoder according to the first embodiment. FIG. 4A is a perspective view illustrating a casing 44 of the magnetic encoder according to the first embodiment. FIG. 4B is a side view illustrating the casing 44 in FIG. 4A. FIG. 4C is a sectional view illustrating the casing 44 taken along line 4C-4C in FIG. 4B. In the following description, the sensor assembly will be mainly explained and explanation on an object to be detected by the magnetic encoder will be omitted, since the object can be the toothed wheel 14 as described in relation to FIG. 1, for example.

The sensor assembly 40 includes a casing 44, magnetic sensors 46 and 48 accommodated in the casing 44, and a magnet 50 accommodated in the casing 44 and positioned proximately to the magnetic sensors 46 and 48. The casing 44 has a hollow rectangular parallelepiped shape. The casing 44 has an opposite wall 52 positioned to be opposite to an object to be detected (not shown), a peripheral wall 54 extending at right angle from a peripheral edge of the opposite wall 52, and a cover (not shown) attached to the peripheral wall 54 via threaded holes 56. The cover provided to close an opening defined by the casing 44 is not shown in other drawings, either, in order to clearly illustrate the structure inside the sensor assembly 40. The magnetic sensors 46 and 48 and the magnet 50 are accommodated in the interior 58 defined by the casing 44.

The opposite wall 52 has thin portions 52a and thickened portions 52b, as shown in FIGS. 4B and 4C. Two thin portions 52a are provided to be spaced apart from each other, forming recesses in the interior of the casing 44. The thin portions 52a are formed on an inner surface of the opposite wall 52 by means of machine-cutting, for example, so as to have a thickness in the range between about 50 μm and about 100 μm, preferably in the range between about 50 μm and about 80 μm. The remaining portions of the opposite wall 52 other than the thin portions 52a are defined by the thickened portions 52b having a thickness of about 300 μm, for example. The opposite wall 52 is integrally formed by a single part. Thus, the thin portions 52a and the thickened portions 52b are formed from a single part without recourse to chemical and/or mechanical attaching means such as an adhesive, fitting and screws. In FIG. 4B, the magnetic sensors 46 and 48 are virtually illustrated by dashed lines drawn around the thin portions 52a. The thin portions 52a extend over an area only slightly larger than the size of the magnetic sensors 46 and 48, since the thin portions 52a designed to be unnecessarily large require more time to machine to form them.

The casing 44 has a guide portion 62 for guiding a substrate 60 of the magnetic sensors 46 and 48 on an inner surface of the opposite wall 52 and a receiving portion 64 for receiving the magnet holder 42. The magnetic sensors 46 and 48 are inserted to the casing 44 along with the substrate 60 to which the magnetic sensors 46 and 48 are soldered. In this process, the magnetic sensors 46 and 48 are inserted until they come in contact with the inner surface of the thin portions 52a, while a peripheral edge of the substrate 60 is guided by the guide portion 62. Such a guide portion 62 can prevent the substrate 60 from inclining or the magnetic sensors 46 and 48 from being misaligned when the magnetic sensors 46 and 48 are inserted to the casing 44. As shown in FIG. 2B or 2C, a surface of the substrate 60 is designed to be spaced apart from a substrate limiting portion 66 when the magnetic sensors 46 and 48 are in contact with the inner surface of the thin portions 52a.

The magnet 50 is provided on a surface of the substrate 60 opposite of the surface where the magnet sensors 46 and 48 are soldered. The magnet 50 is held in the casing 44 by the magnet holder 42 having a through hole 68 having the size corresponding to the magnet 50. The magnet holder 42 is adapted to come in contact with a receiving portion 64 which extends inwardly from the opposite wall 52 and inwardly from the peripheral wall 54. The magnet holder 42 is in the form of a rectangular frame with the through hole 68 formed in the center thereof, as shown in FIG. 3. The through hole 68 has a plurality of notches 70 on the four corners and at least a part of the four edges, so as to form gaps with the outer peripheral surface of the magnet 50. Adhesives are injected into the notches 70 after the magnet 50 and the magnet holder 42 are placed in position. Blackened portions in FIGS. 2A and 2C represent the portions into which resins are injected. With the resin injected into the gaps, the magnet 50 and the magnet holder 42 are secured in position.

When the magnet holder 42 with the magnet 50 is inserted to the casing 44, a plate made of metal having a magnetic property, which is not shown, may also be used. If the magnet 50 is inserted to the casing 44 with the opposite wall 52 of the casing 44 in contact with the metal plate, an assembling process can be carried out while the magnet 50, the substrate 60, the magnetic sensors 46 and 48, the thin portion 52a and the metal plate are tightly contacted with one another with the aid of attractive magnetic force generated between the magnet 50 and the metal plate.

The magnet holder 42 also has a lead guide portion 72. The lead guide portion 72 is defined by a cutout portion substantially having a rectangular shape formed by removing a part of an edge of the magnet holder 42. Leads (not shown) for transmitting detection signals of the magnetic sensors 46 and 48 are drawn out from the substrate 60 through the lead guide portion 72. Thus, the lead guide portion 72 serves as a pathway through which the leads are drawn out of the magnetic sensors 46 and 48.

The casing 44 has a cable installation portion 76 attached on one side surface of the peripheral wall 54 by means of screws 74. The cable installation portion 76 has a through hole 78 communicative with a through hole 80 formed on the side surface of the peripheral wall 65 of the casing 44. Via the through holes 78 and 80, a cable (not shown) for transmitting and receiving signals with, e.g., a control circuit (not shown) can be inserted. The cable is connected to leads drawn out of the substrate 60 or a substrate of the control circuit in the interior 58 of the casing 44. A bushing 82 is provided between the through hole 78 and the through hole 80 to install the cable in a sealing manner.

In the configuration according to the embodiment, the magnetic sensors 46 and 48 are provided on the thin portions 52a which are thinner than the remaining portions of the opposite wall 52, as shown in FIG. 2C, for example. More specifically, the magnetic sensors 46 and 48 are positioned so as to come in contact with the thin portions 52a of the opposite wall 52. The configuration limits influence on sensitivity of the magnetic sensors 46 and 48 resulting from the opposite wall 52 interposed between the magnetic sensors 46 and 48 and the object to be detected (not shown).

The thin portions 52a and the thickened portions 52b of the opposite wall 52 are integrally formed with each other to form the opposite wall 52. Thus, there is no need for an additional process of providing a separate thin plate in order to form the thin portion 52a, or of fixing such a plate by mechanical means. The thin portions 52a are recesses formed on the inner surface of the opposite wall 52, e.g., by means of machine-cutting. The thin portions 52a are locally provided on the portions where the magnetic sensors 46 and 48 are situated. The remaining portions of the opposite wall 52 other than the thin portions 52a have a greater thickness than the thin portions 52a. This means that the opposite wall 52 has greater structural strength than a single thin plate, and therefore, the opposite wall 52 tends not to be deformed even if force is applied thereto during a machine-cutting process, for example.

The fact that the opposite wall 52 has sufficient structural strength to avoid from being deformed is advantageous at least in the following two respects. Firstly, since the thin portions 52a tends not to be deformed when machined by the machine tool, the object to be machined tends not to be displaced. This allows a machine head to be controlled in accordance with control commands and the thin portions 52a to be formed with great precision. For example, it is very difficult to form a thin plate having a thickness of 100 μm or less in the known technique. In contrast, with the configuration in which the thin portions 52a are reinforced by the thickened portions 52b according to the present invention, the thin portions 52a can be formed to have a thickness in the range between 50 μm and 100 μm.

Secondly, it is advantageous in that a greater margin can be allowed for deformation of the opposite wall when the thin portions are formed. Therefore, machining speed can be increased, compared to the case where the opposite wall is entirely formed by a thin plate and such opposite wall is machined. This allows time required to form the thin portions 52a to be shortened, increasing productivity and reducing a manufacturing cost.

In the case where a separate thin plate is additionally attached, a gap may be formed between the joined portions, or adhesive force may be decreased over time, resulting in the decreased structural strength. In contrast, according to the configuration in the embodiment in which the opposite wall 52 is integrally formed, such problems can be overcome.

Other embodiments of the present invention will be now described. Like elements in different drawings or embodiments that have similar structures or functions are designated with the same reference numerals. The description directed to the above embodiment can be applied to other embodiments as well, unless mentioned otherwise. The same explanation applied to other embodiments will be omitted.

Figure 5A:
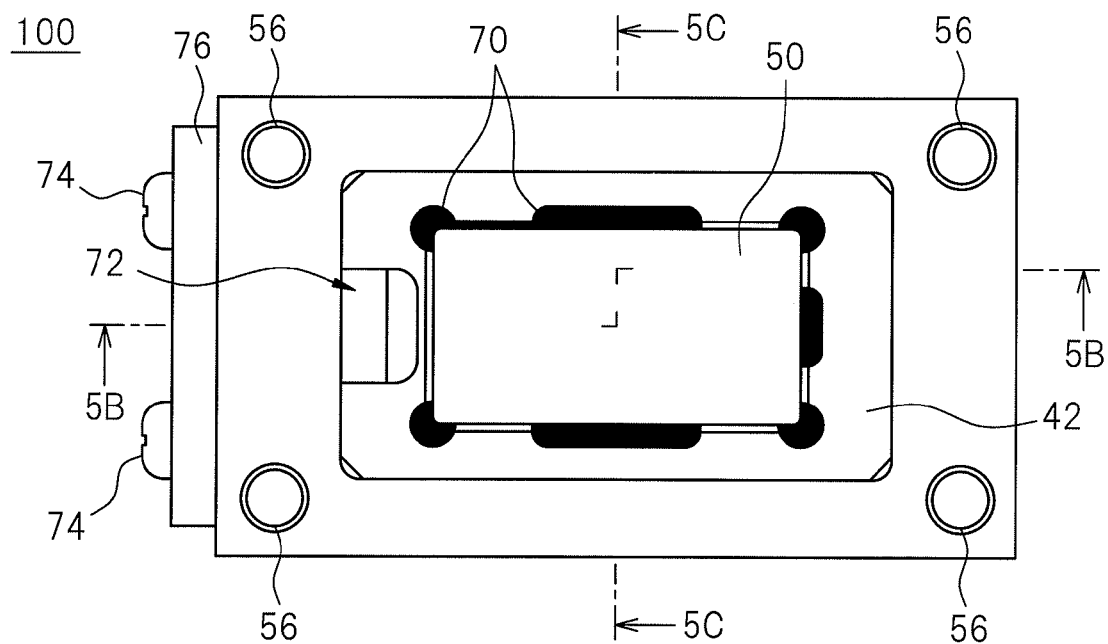
FIG. 5A is a side view illustrating a sensor assembly of a magnetic encoder according to a second embodiment of the present invention.
Figure 5B:
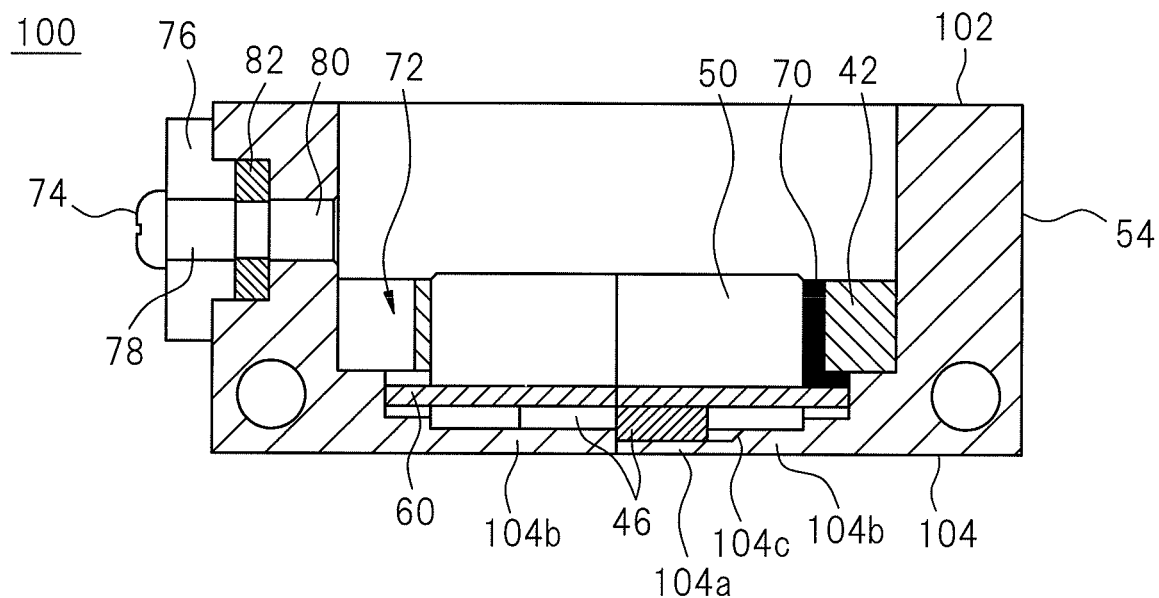
FIG. 5B is a sectional view illustrating the sensor assembly taken along line 5B-5B in FIG. 5A.
Figure 5C:
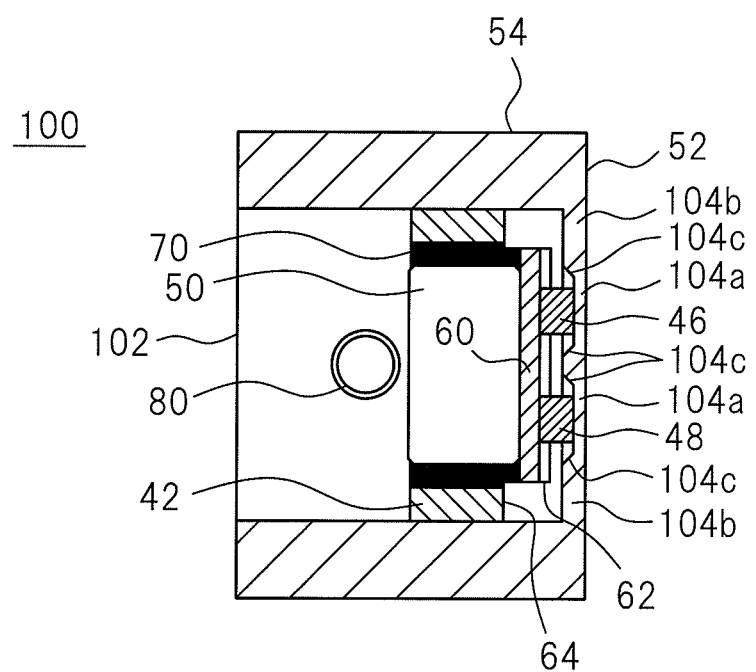
FIG. 5C is a sectional view illustrating the sensor assembly taken along line 5C-5C in FIG. 5A.

FIG. 5A is a side view illustrating a sensor assembly 100 of a magnetic encoder according to a second embodiment. FIG. 5B is a sectional view illustrating the sensor assembly 100 taken along line 5B-5B in FIG. 5A. FIG. 5C is a sectional view illustrating the sensor assembly 100 taken along line 5C-5C in FIG. 5A.

The sensor assembly 100 in this embodiment is different from the above-described sensor assembly 40 in the configuration of the opposite wall 104 of the casing 102. Specifically, the sensor assembly 40 has the thin portions 52a whose circumferential edges extend perpendicular to the opposite wall 52 and directly shifts to the thickened portions 52b. In contrast, the sensor assembly 100 in this embodiment has a transition portion 104c between the thin portion 104a and the thickened portion 104b as illustrated. The transition portion 104c defines a slant surface having a constant inclination so as to have a thickness that linearly changes. With the transition portion 104c, the thin portion 104a and the thickened portion 104b are smoothly connected to each other, without the thickness therebetween being abruptly changed. Therefore, stress concentration that may occur in the boundary between the thin portion 104a and the thickened portion 104b can be reduced, even when external force is unintentionally applied to the opposite wall 104. In this way, the thin portion 104a can be prevented from being deformed or damaged. In addition, the transition portion 104c having a thickness that linearly changes is advantageous, since it is relatively easy to form.

Figure 6A:
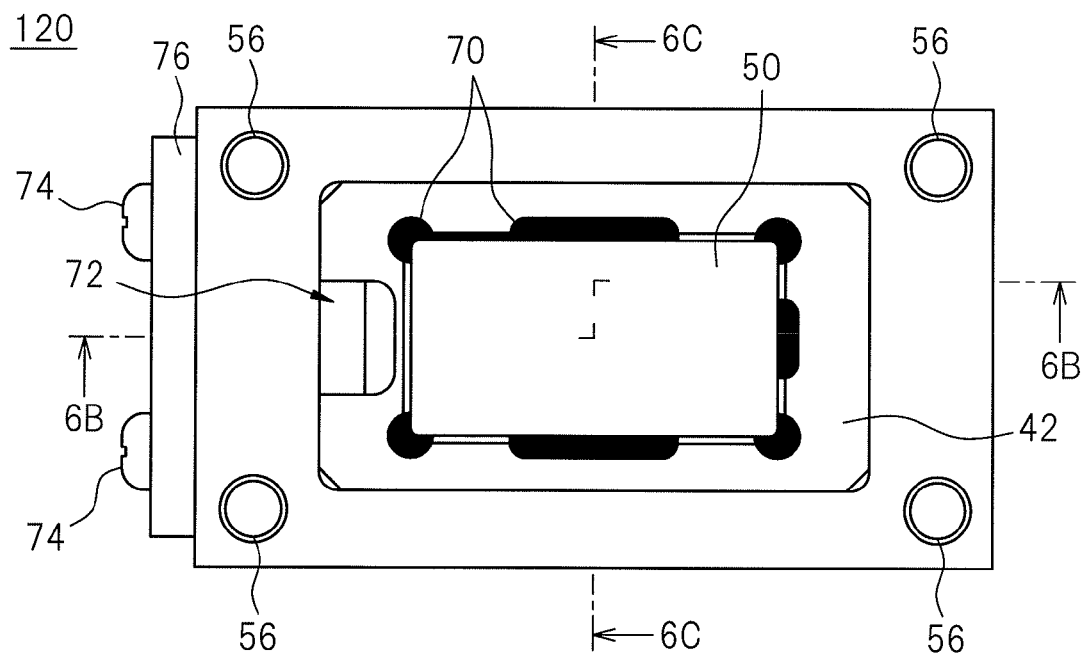
FIG. 6A is a side view illustrating a sensor assembly of a magnetic encoder according to a third embodiment of the present invention.
Figure 6B:
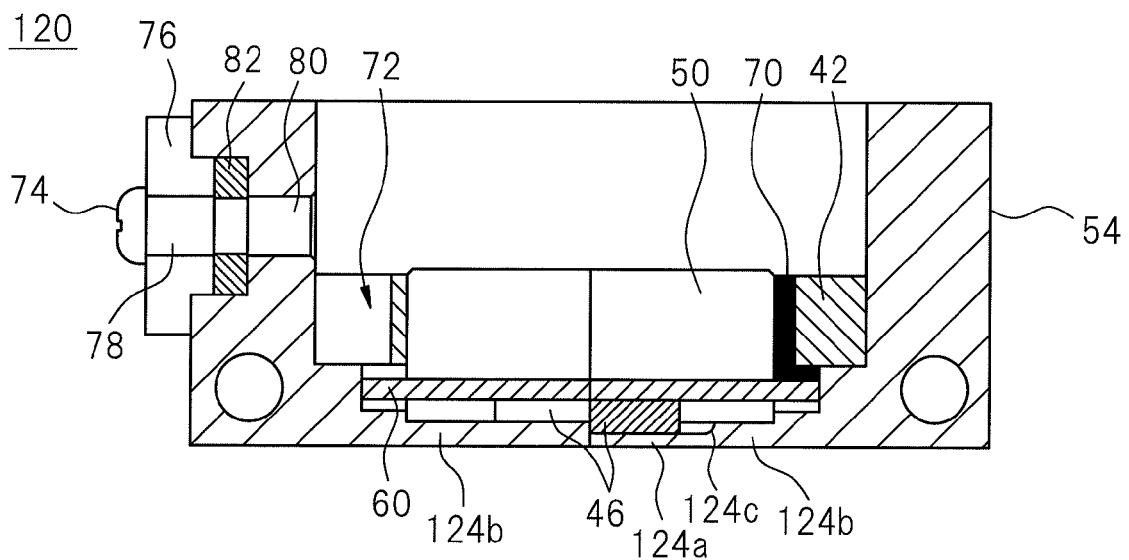
FIG. 6B is a sectional view illustrating the sensor assembly taken along line 6B-6B in FIG. 6A.
Figure 6C:
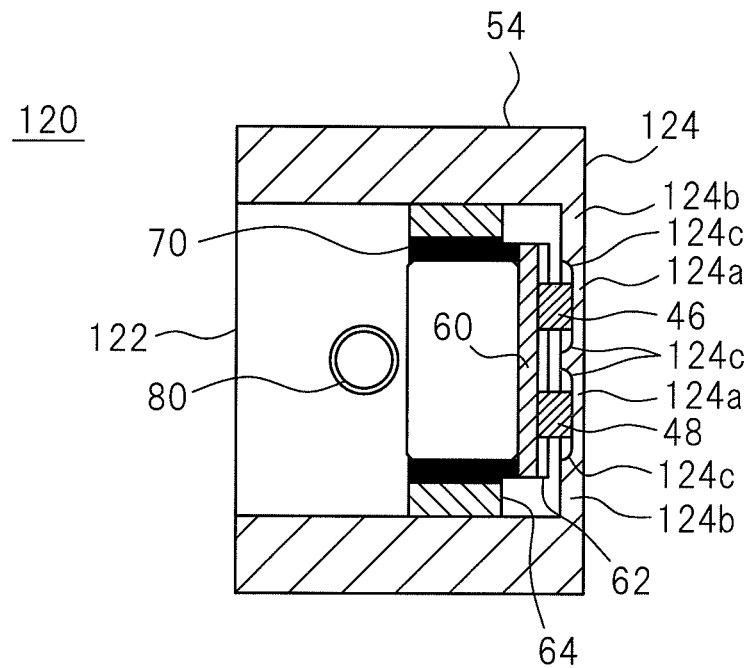
FIG. 6C is a sectional view illustrating the sensor assembly taken along line 6C-6C in FIG. 6A.

FIG. 6A is a side view illustrating a sensor assembly 120 of a magnetic encoder according to a third embodiment. FIG. 6B is a sectional view illustrating the sensor assembly 120 taken along line 6B-6B in FIG. 6A. FIG. 6C is a sectional view illustrating the sensor assembly 120 taken along line 6C-6C in FIG. 6A.

The sensor assembly 120 in this embodiment is different from the above-described sensor assembly 40 or 100 in the configuration of the opposite wall 124 of the casing 122. Specifically, the sensor assembly 120 has a transition portion 124c between the thin portion 124a and the thickened portion 124b. The transition portion 124c has a slant surface having an inclination that changes in a predetermined rate such that the thickness of the transition portion 124c changes in a curved manner. With the transition portion 124c, the thin portion 124a and the thickened portion 124b are smoothly connected to each other, without the thickness thereof being abruptly changed. Therefore, stress concentration that may occur in the boundary between the thin portion 124a and the thickened portion 124b can be reduced, even when external force is unintentionally applied to the opposite wall 124. In this way, the thin portion 124a can be prevented from being deformed or damaged.

According to the second and third embodiments, the examples in which the thickness of the transition portion 104c or 124c between the thin portion 104a or 124a and the thickened portion 104b or 124b continuously changes, i.e., linearly or in a curved manner, have been described. However, it is needless to say that a shape for avoiding or reducing stress concentration is not limited to the particular shapes as illustrated. For example, the portion whose thickness linearly changes and the portion whose thickness changes in a curved manner may be combined together such that these portions are smoothly connected to each other.

Figure 7A:
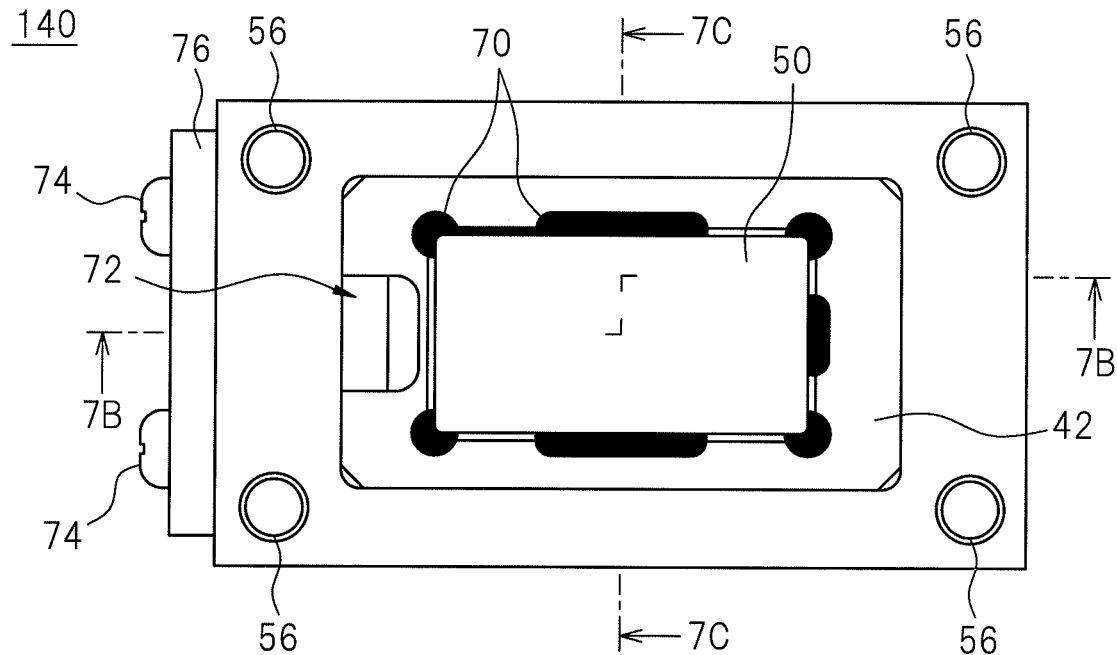
FIG. 7A is a side view illustrating a sensor assembly of a magnetic encoder according to a fourth embodiment of the present invention.
Figure 7B:
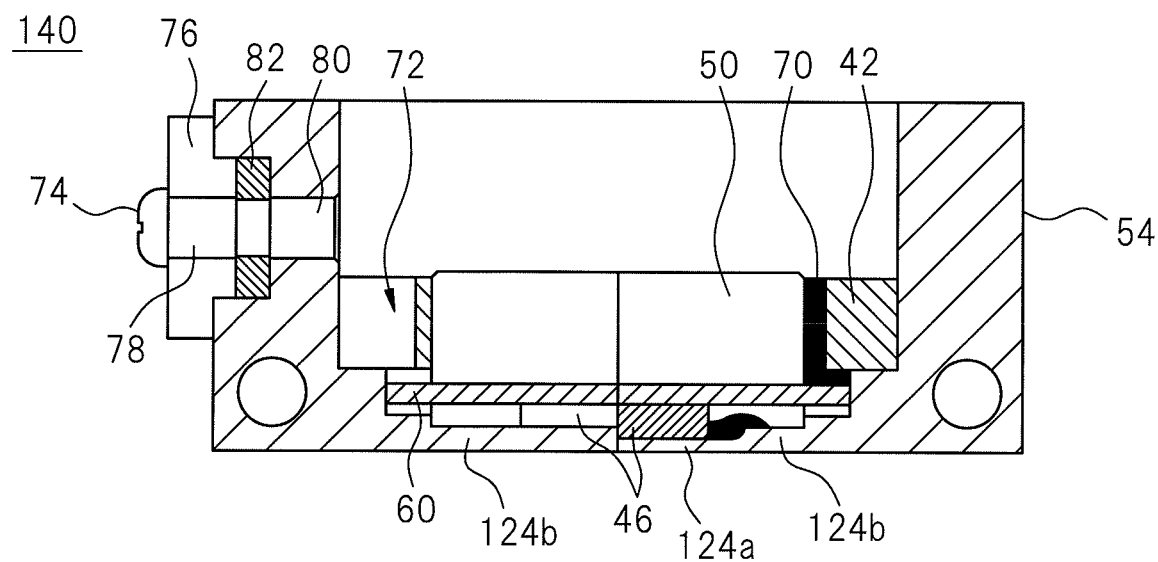
FIG. 7B is a sectional view illustrating the sensor assembly taken along line 7B-7B in FIG. 7A.
Figure 7C:
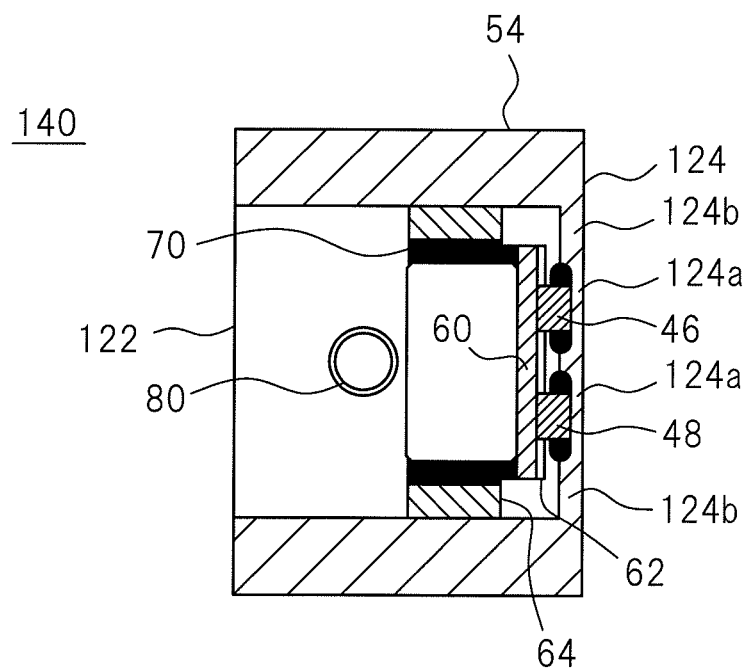
FIG. 7C is a sectional view illustrating the sensor assembly taken along line 7C-7C in FIG. 7A.

FIG. 7A is a side view illustrating a sensor assembly 140 of a magnetic encoder according to a fourth embodiment. FIG. 7B is a sectional view illustrating the sensor assembly 140 taken along line 7B-7B in FIG. 7A. FIG. 7C is a sectional view illustrating the sensor assembly 140 taken along line 7C-7C in FIG. 7A.

The sensor assembly 140 in this embodiment has recesses defined by the thin portions 124a in the peripheral edges of the magnetic sensors 46 and 48, and the recess is filled with resin such as epoxy resin. In the drawings, the blackened portions represent portions to which the resin is provided. As illustrated, the resin is provided so as to extend over a portion ranging from the inner surface of the thin portion 124a to at least the same height as the inner surface of the thickened portion 124b. This configuration serves as if the thickness of the thin portions 124a became greater, enhancing the structural strength of the thin portions 124a. Therefore, the thin portions 124a can be prevented from being deformed or damaged, even when external force is unintentionally applied to the opposite wall 124.

Figure 8A:
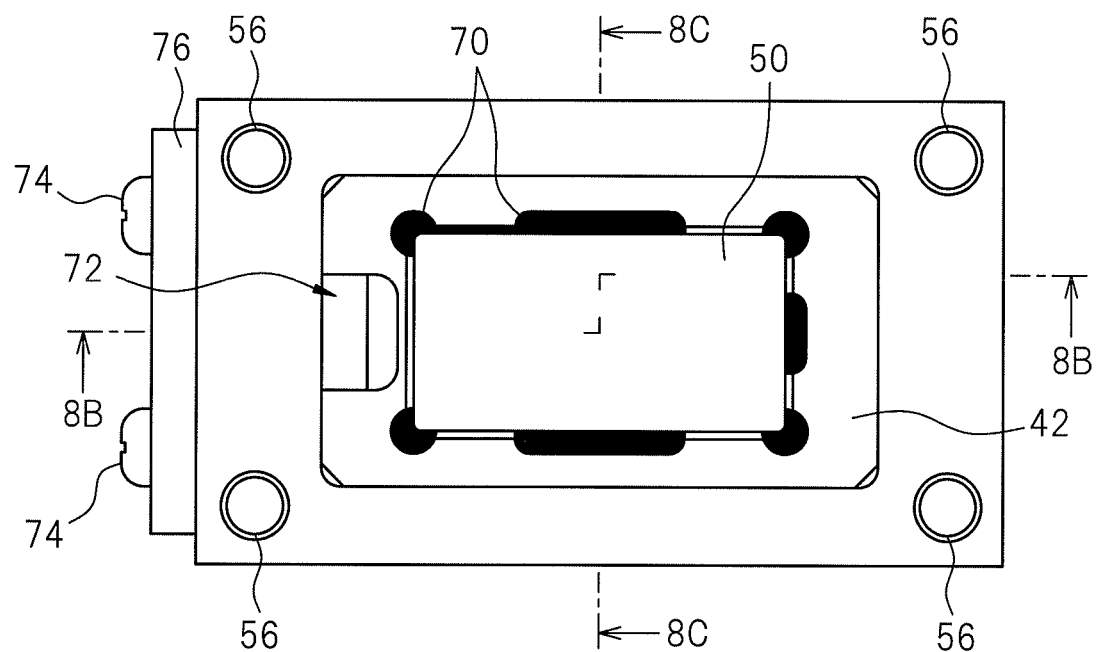
FIG. 8A is a side view illustrating a sensor assembly of a magnetic encoder according to a fifth embodiment of the present invention.
Figure 8B:
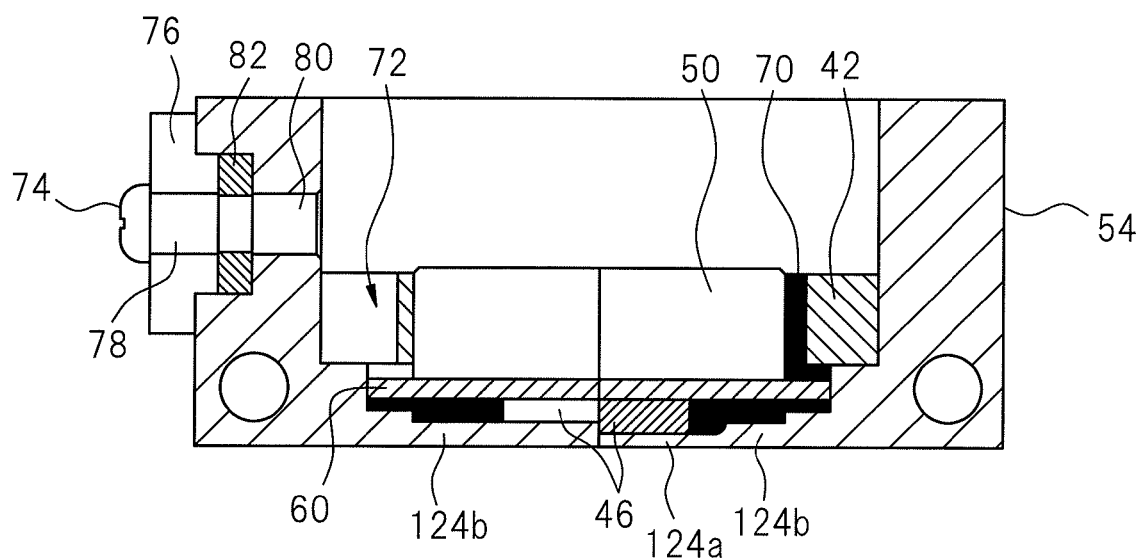
FIG. 8B is a sectional view illustrating the sensor assembly taken along line 8B-8B in FIG. 8A.
Figure 8C:
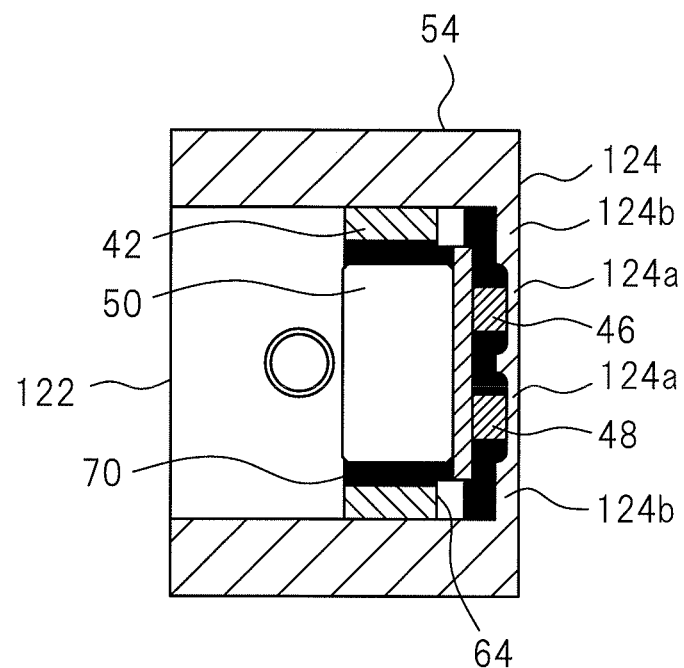
FIG. 8C is a sectional view illustrating the sensor assembly taken along line 8C-8C in FIG. 8A.

FIG. 8A is a side view illustrating a sensor assembly 150 of a magnetic encoder according to a fifth embodiment. FIG. 8B is a sectional view illustrating the sensor assembly 150 taken along line 8B-8B in FIG. 8A. FIG. 8C is a sectional view illustrating the sensor assembly 150 taken along line 8C-8C in FIG. 8A.

The sensor assembly 150 in this embodiment has a configuration in which resin is provided in the periphery of the magnetic sensors 46 and 48, similarly to the above-mentioned sensor assembly 140 according to the fourth embodiment. In the drawings, blackened portions represent portions where the resin is provided. As illustrated, in the sensor assembly 150, the resin is provided substantially entirely over an area surrounded by the magnetic sensors 46 and 48, the inner surface of the opposite wall 52 and the substrate 60. This allows a gap between the thin portions 52a and the substrate 60 opposite to the thin portions 52a to be filled with the resin, and therefore, the thin portions 52a can serve as if they were a solid and rigid wall. Accordingly, the thin portions 52a can be prevented from being deformed or damaged, even if external force is unintentionally applied thereto. Although in order to explain the fourth and fifth embodiments as illustrated, the exemplary casing 122 according to the third embodiment as illustrated in FIGS. 6A, 6B and 6C is used for the sake of convenience, the sensor assembly having the casing of any shape according to other embodiments as described herein can also be used.

Figure 9A:
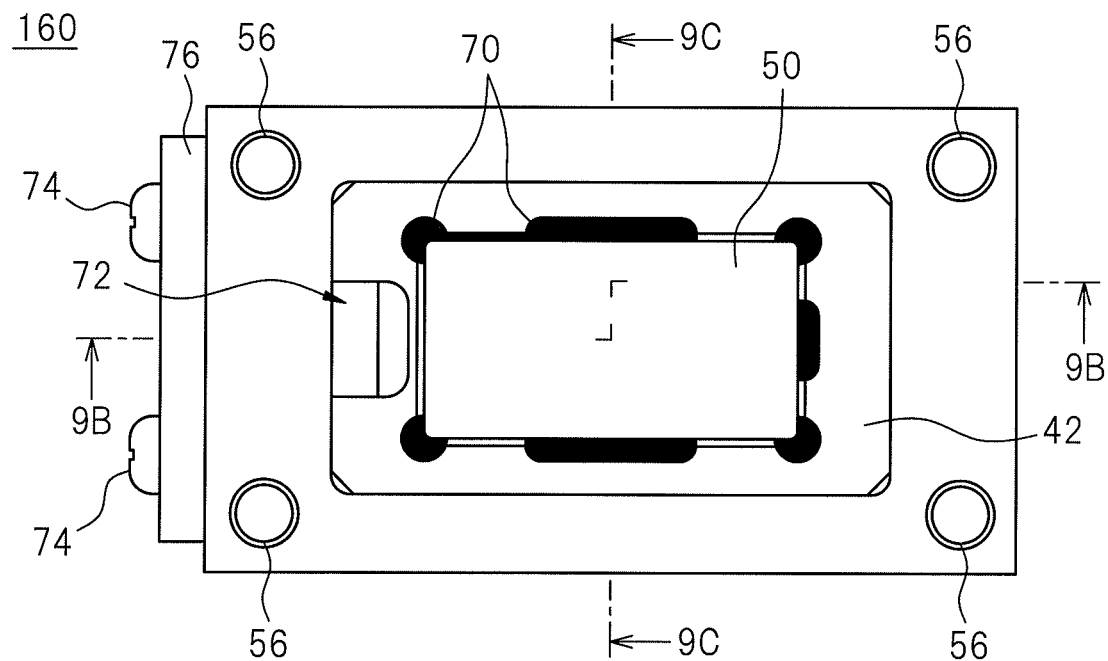
FIG. 9A is a side view illustrating a sensor assembly of a magnetic encoder according to a sixth embodiment of the present invention.
Figure 9B:
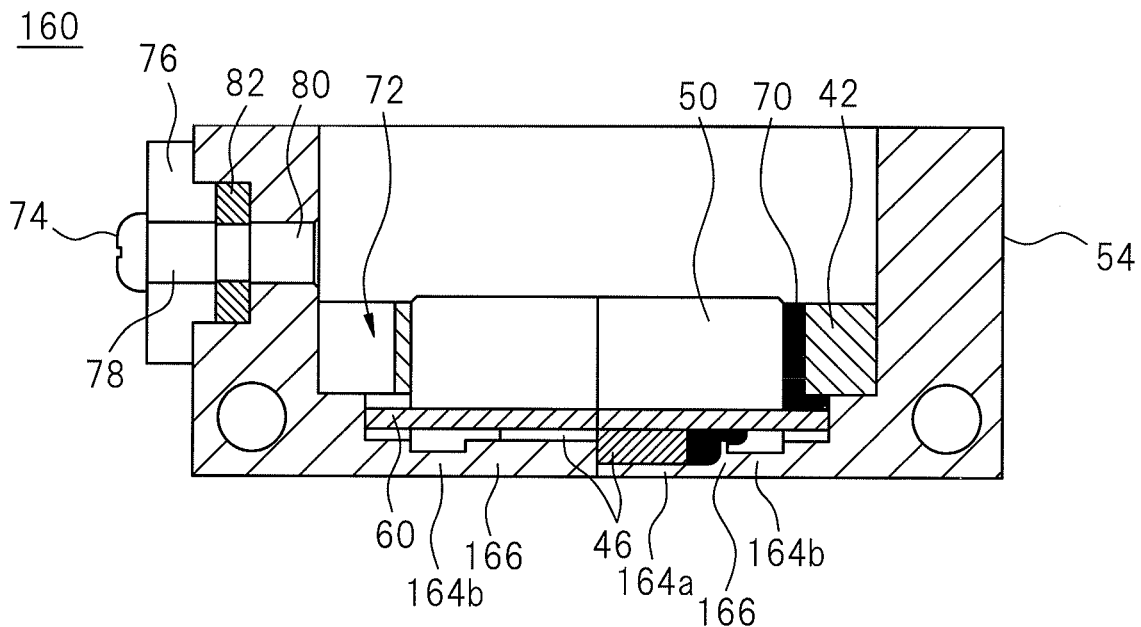
FIG. 9B is a sectional view illustrating the sensor assembly taken along line 9B-9B in FIG. 9A.
Figure 9C:
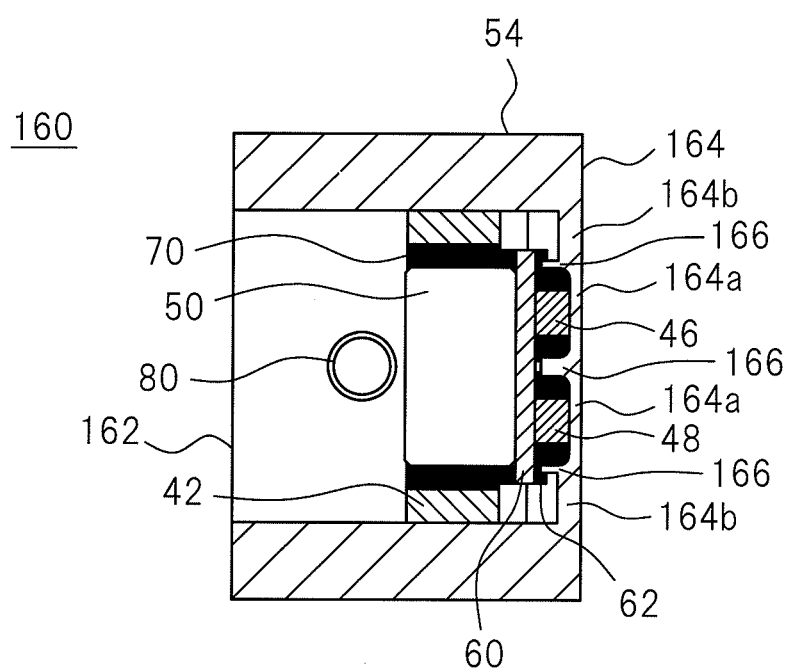
FIG. 9C is a sectional view illustrating the sensor assembly taken along line 9C-9C in FIG. 9A.
Figure 10A:
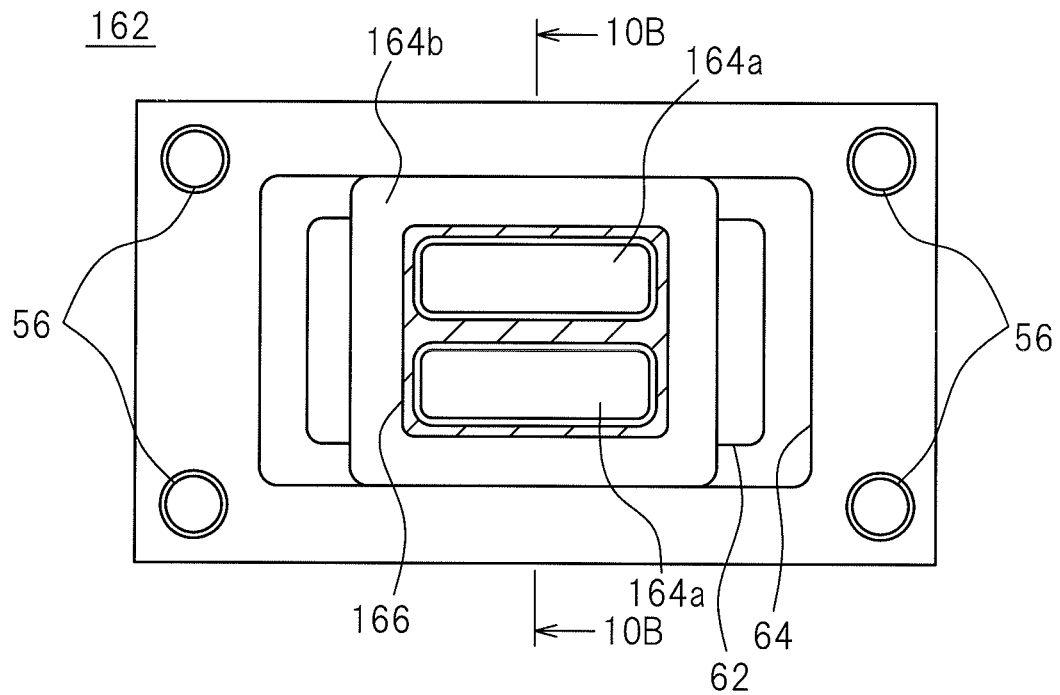
FIG. 10A is a side view illustrating a casing of the magnetic encoder according to a sixth embodiment of the present invention.
Figure 10B:
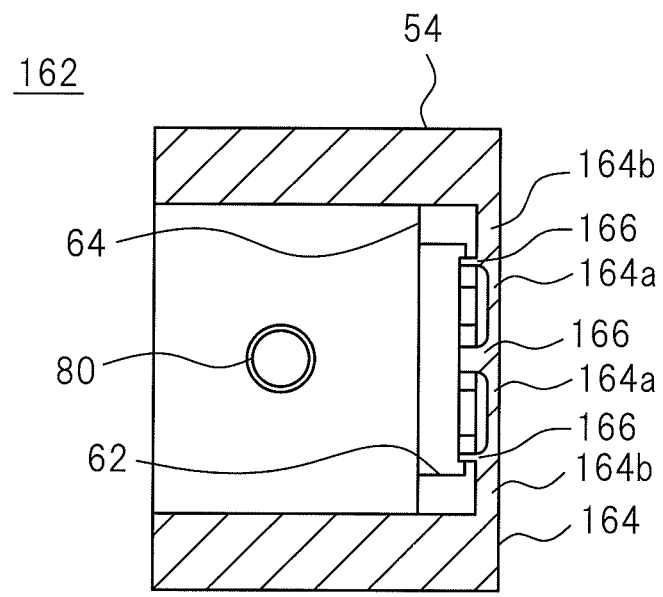
FIG. 10B is a sectional view illustrating the casing of taken along line 10B-10B in FIG. 10A.

FIG. 9A is a side view illustrating a sensor assembly 160 of a magnetic encoder according to a sixth embodiment. FIG. 9B is a sectional view illustrating the sensor assembly 160 taken along line 9B-9B in FIG. 9A. FIG. 9C is a sectional view illustrating the sensor assembly 160 taken along line 9C-9C in FIG. 9A. FIG. 10A is a side view illustrating a casing 162 of the magnetic encoder according to the embodiment. FIG. 10B is a sectional view illustrating the casing 162 taken along line 10B-10B in FIG. 10A.

The sensor assembly 160 in this embodiment has a protrusion 166 which extends inwardly from the inner surface of the opposite wall 164 of the casing 162. The protrusion 166 continuously extends to surround the periphery of the thin portions 164a, as illustrated in FIGS. 10A and 10B. In the illustrated embodiment, the protrusion 166 extends in the form of "8" in side view to surround each of the two thin portions (see FIG. 10A).

The protrusion 166 protrudes to the extent that a small gap is formed between the protrusion 166 and the surface of the substrate 60 when the magnetic sensors 46 and 48 are placed in position (not only the case where the magnetic sensors are in contact with the inner surface of the thin portions as illustrated, but also the case where a gap is formed between the magnetic sensors and the thin portions as described below). In the illustrated embodiment, the protrusion 166 extends inwardly beyond the inner surface of the thickened portions 164b in the casing 162.

In FIGS. 9A, 9B and 9C, the blackened portions represent portions where resin is provided. As illustrated, the resin spreads in a space between the magnetic sensors 46 and 48 and the protrusion 166. In other words, the resin is provided in a recess defined by the thin portions 164a, since the protrusion 166 also defines a peripheral wall of the thin portions 164a. With the protrusion 166 formed in the periphery of the thin portions 164a, the thin portions 164a is sufficiently filled with a relatively small amount of the resin. The thin portions 164a are reinforced by the filling resin, as described above. Accordingly, the thin portions 164a can be provided from being deformed or damaged, even if external force is unintentionally applied to the opposite wall 164.

In the sensor assembly 160 in this embodiment, the magnetic sensors 46 and 48 are provided as follows. First, a certain amount of resin is applied to the thin portions 164a prior to insertion of the magnetic sensors 46 and 48. The magnetic sensors 46 and 48 are then inserted to the casing 164 toward the thin portions 164a.

The resin which has been applied on the thin portions 164a is pushed by the magnetic sensors 46 and 48 to move, as the magnetic sensors 46 and 48 are introduced toward the inner surface of the thin portions 164a. In this process, an extra amount of resin which is not stored at the thin portions 164a is pushed out of the thin portions 164a through the gap between the protrusion 166 and the surface of the substrate 60. Accordingly, in the sensor assembly 160 according to the embodiment, the resin can be easily provided to the thin portions 164a without special means.

Figure 11A:
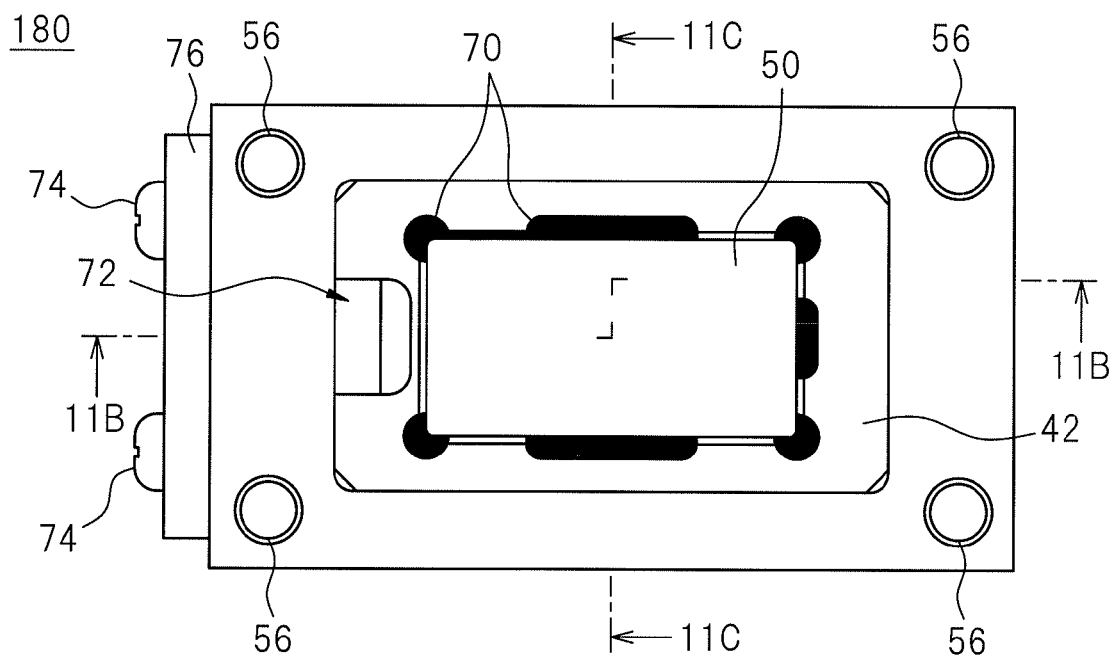
FIG. 11A is a side view illustrating a sensor assembly of a magnetic encoder according to a seventh embodiment of the present invention.
Figure 11B:
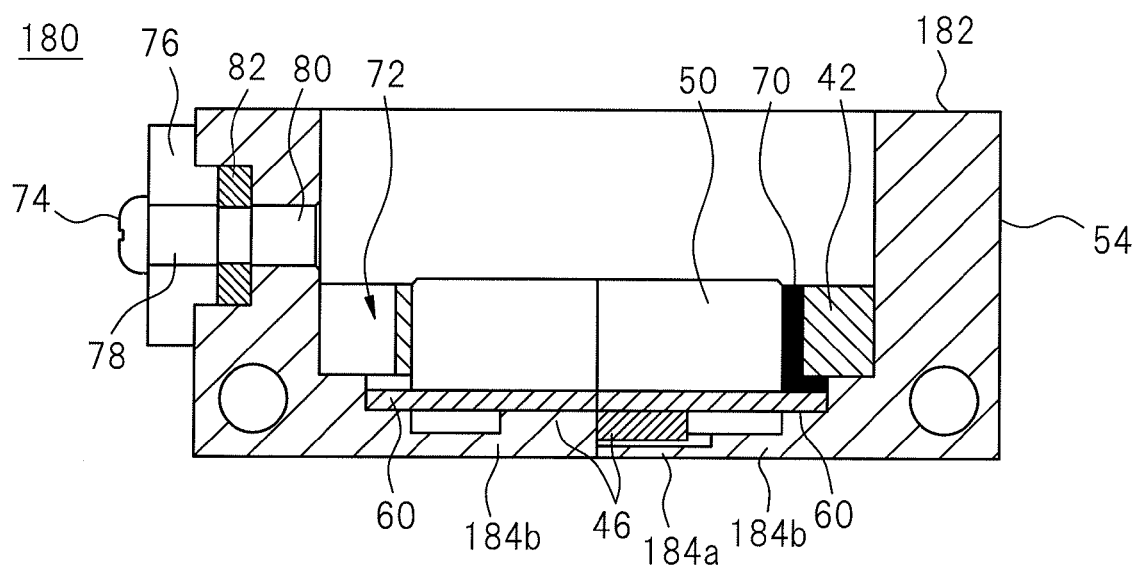
FIG. 11B is a sectional view illustrating the sensor assembly taken along line 11B-11B in FIG. 11A.
Figure 11C:
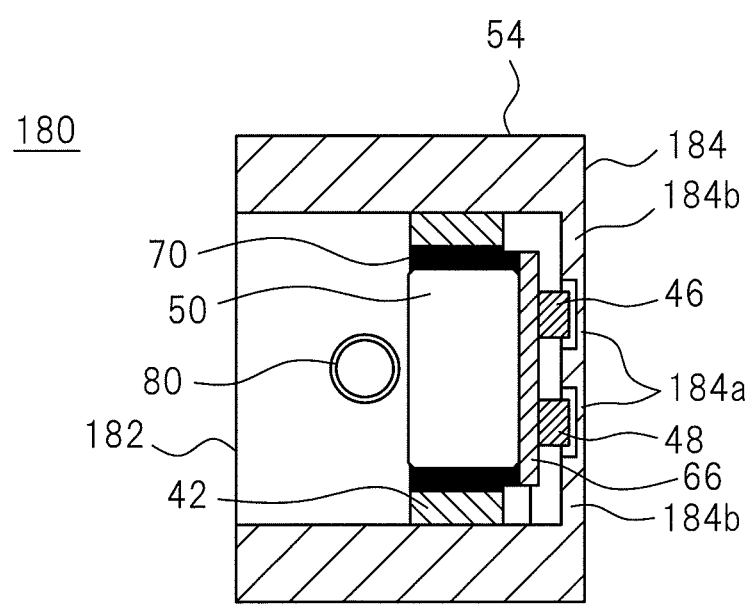
FIG. 11C is a sectional view illustrating the sensor assembly taken along line 11C-11C in FIG. 11A.

FIG. 11A is a side view illustrating a sensor assembly 180 of a magnetic encoder according to a seventh embodiment. FIG. 11B is a sectional view illustrating the sensor assembly 180 taken along line 11B-11B in FIG. 11A. FIG. 11C is a sectional view illustrating the sensor assembly 180 taken along line 11C-11C in FIG. 11A.

In the sensor assembly 180 in this embodiment, although the magnetic sensors 46 and 48 are situated at the thin portions 184a on the opposite wall 184 of the casing 182 in common with other embodiments, the sensor assembly 180 is different from other embodiments in that a gap is defined between the inner surfaces of the thin portions 184a and the magnetic sensors 46 and 48. In the illustrated embodiment, the surfaces of the magnetic sensors 46 and 48 opposite to the thin portions 184a are situated between the thin portions 184a and the inner surfaces of the thickened portions 184b. In this embodiment, the magnetic sensors 46 and 48 are positioned by bringing the surface of the substrate 60 in contact with the substrate limiting portion 66, rather than with the thin portions 184a. Preferably, the magnetic sensors 46 and 48 are at a very small distance, e.g., in the range between about 50 μm and about 100 μm, away from the inner surface of the thin portions 184a in order to maintain good sensitivity of the magnetic sensors 46 and 48. If necessary, the magnet 50 can be replaced with a magnet having greater magnetic force in this embodiment as well as other embodiments.

According to the embodiment, the thin portions 184a can be prevented from being pressed by the magnetic sensors 46 and 48, when the magnetic sensors 46 and 48 are introduced toward the thin portions 184a and positioned relative to the thin portions 184a. Therefore, the thin portions 184a can be prevented from being deformed or damaged, even if excessive force is unintentionally applied to the thin portions 184a.

EFFECT OF THE INVENTION

According to the first aspect of the invention, since the opposite wall of the casing situated between the magnetic sensor and the object is formed as the thin portion, sensitivity of the magnetic sensor is improved. In addition, since the opposite wall of the casing is reinforced by the thickened portion formed together with the thin portion, the opposite wall can be prevented from being deformed, especially when the thin portion is formed. Deformation of the opposite wall during a machining process can be minimized in this way, and therefore machining accuracy is improved, resulting in enhanced sensitivity of the magnetic sensor. Further, since a greater margin is allowed for deformation of the opposite wall when the thin portion is formed, less time is required to machine the thin portion, compared to the known technique. Furthermore, since the thin portion is integrally formed with the thickened portion, there is no need to attach a separate thin plate in the subsequent process, and therefore, improved productivity can be achieved. In addition, unlike the known technique in which a separate thin plate is provided, there is no risk of forming a gap between the joined portions of the members, and therefore, enhanced reliability can be achieved.

According to the second aspect of the invention, since the thin portion is formed by means of machine-cutting, a process of attaching a separate thin plate to the casing is not required. Thus, it takes less time to assemble the casing, and improved productivity can be achieved. In addition, unlike the known technique in which a separate thin plate is provided, there is no risk of forming a gap between the joined portions of the members, and therefore, enhanced reliability can be achieved. Further, a thin portion having a desired shape can be formed depending on its application, without a need of additional means such as a mold, and therefore, a greater applicability can be achieved, facilitating design changes.

According to the third aspect of the invention, the thickness of the opposite wall of the casing continuously changes on the transition portion between the thickened portion and the thin portion. Accordingly, stress concentration that may occur in the boundary between the thin portion and the thickened portion can be reduced, and the thin portion can be prevented from being deformed and damaged, even if external force is unintentionally applied to the opposite wall.

According to the fourth aspect of the invention, the thickness of the opposite wall of the casing linearly changes. Thus, stress concentration that may occur in the boundary between the thin portion and the thickened portion can be reduced, and the thin portion can be prevented from being deformed and damaged, even if external force is unintentionally applied to the opposite wall. In addition, since the transition portion is formed so as to have a thickness that linearly changes and a machining process is relatively simple.

According to the fifth aspect of the invention, the thickness of the opposite wall of the casing changes in a curved manner. Thus, stress concentration that may occur in the boundary between the thin portion and the thickened portion can be reduced, and the thin portion can be prevented from being deformed and damaged, even if external force is unintentionally applied to the opposite wall. In addition, the thickness of the transition portion can be precisely changed in accordance with the stress concentration that may locally occur. Therefore, enhanced effect of preventing the thin portion from being deformed or damaged can be achieved.

According to the sixth aspect of the invention, the thin portion is reinforced by the resin provided at the thin portion defining a recess on the inside of the casing. Accordingly, the thin portion can be prevented from being deformed or damaged, even if external force is unintentionally applied to the opposite wall.

According to the seventh aspect of the invention, since the protrusion is formed in the periphery of the thin portion, a desirable reinforcing effect can be achieved, while an area where the resin provided at the thin portion spreads can be limited. Accordingly, the thin portion can be reinforced, while use of the resin is minimized.

According to the eighth aspect of the invention, a plurality of thin portions are formed, allowing a plurality of magnetic sensors to be used. In addition, since a portion between the adjacent thin portions is formed as a thickened portion, the thin portions can be prevented from being deformed or damaged, even if external force is unintentionally applied to the opposite wall.

According to the ninth aspect of the invention, a gap is formed between the magnetic sensor and the surface of the thin portion. Thus, the thin portion is prevented from being pressed by the magnetic sensor, when the magnetic sensor is placed in position. Accordingly, the thin portion can be prevented from being deformed and damaged.

According to the tenth aspect of the invention, since the thin portion has a thickness in the range between 50 µm and 100 µm, good sensitivity of the magnetic sensor is maintained.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A magnetic encoder, comprising:
    an object to be detected made of a magnetic material and capable of rotating about a rotational axis;
    a casing made of a non-magnetic material and spaced apart from the object in a direction perpendicular to the rotational axis;
    a magnet accommodated in the casing for generating a magnetic field; and
    a magnetic sensor for detecting changes in a magnetic field corresponding to rotational movement of the object, the magnetic sensor being accommodated in the casing and situated between the magnet and the object, wherein
    an opposite wall of the casing opposite to the object has a thickened portion and a thin portion integrally formed with the thickened portion, the thin portion having a smaller thickness than the thickened portion, the magnetic sensor being situated at the thin portion,
    the thin portion defines a recess on an inner surface of the opposite wall, resin being provided in the recess, and
    a plurality of thin portions are situated in a plurality of positions on the opposite wall, wherein a portion of the opposite wall extending between the thin portions adjacent to each other has a larger thickness than that of the thin portions.

2. The magnetic encoder according to claim 1, wherein the thin portion of the opposite wall of the casing is formed by machine-cutting.

3. The magnetic encoder according to claim 1, wherein the opposite wall of the casing has a transition portion between the thickened portion and the thin portion, the transition portion having a thickness which continuously changes between the thickened portion and the thin portion.

4. The magnetic encoder according to claim 3, wherein the transition portion has a thickness which linearly changes between the thickened portion and the thin portion.

5. The magnetic encoder according to claim 3, wherein the transition portion has a thickness which changes in a curved manner between the thickened portion and the thin portion.

6. The magnetic encoder according to claim 1, wherein the thin portion has a protrusion protruding inwardly in the casing from a circumferential edge of the thin portion.

7. The magnetic encoder according to claim 6, wherein the protrusion projects inwardly beyond an inner surface of the thickened portion.

8. The magnetic encoder according to claim 1, wherein the magnetic sensor and an inner surface of the thin portion opposite to the magnetic sensor define a gap therebetween.

9. The magnetic encoder according to claim 1, wherein the thin portion has a thickness in the range between 50 µm and 100 µm.

10. A magnetic encoder, comprising:
    an object to be detected made of a magnetic material and capable of rotating about a rotational axis;
    a casing made of a non-magnetic material and spaced apart from the object in a direction perpendicular to the rotational axis;
    a magnet accommodated in the casing for generating a magnetic field; and
    a magnetic sensor for detecting changes in a magnetic field corresponding to rotational movement of the object, the magnetic sensor being accommodated in the casing and situated between the magnet and the object, wherein
    an opposite wall of the casing opposite to the object has a thickened portion and a thin portion integrally formed with the thickened portion, the thin portion having a smaller thickness than the thickened portion, the magnetic sensor being situated at the thin portion,
    the thin portion defines a recess on an inner surface of the opposite wall, resin being provided in the recess,
    the thin portion has a protrusion protruding inwardly in the casing from a circumferential edge of the thin portion, and
    the protrusion projects inwardly beyond an inner surface of the thickened portion.

* * * * *